US012159756B1

(12) United States Patent
Pierce et al.

(10) Patent No.: US 12,159,756 B1
(45) Date of Patent: Dec. 3, 2024

(54) FIELD-CONFIGURABLE CAPACITIVE MAT

(71) Applicant: AMAZON TECHNOLOGIES, INC., Seattle, WA (US)

(72) Inventors: Andrew James Pierce, Renton, WA (US); James Stephanick, Seattle, WA (US); Joshua Smith, Seattle, WA (US); Nathan P. O'Neill, Snohomish, WA (US); Robert M. Riggs, Winthrop, WA (US); Sergio Alfredo Phan Lung Li, Lake Forest Park, WA (US); Benjamin Hong Yee, Seattle, WA (US); Alan Akiyoshi Nonaka, Seattle, WA (US); Ali Rahimi, Berkeley, CA (US); Graham Cyril Jordan, Edmonds, WA (US); David Bryan Michelman, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 56 days.

(21) Appl. No.: 17/930,657

(22) Filed: Sep. 8, 2022

Related U.S. Application Data

(60) Provisional application No. 63/267,821, filed on Feb. 10, 2022, provisional application No. 63/261,035, filed on Sep. 9, 2021.

(51) Int. Cl.
| | |
|---|---|
| H01G 5/16 | (2006.01) |
| H01G 5/015 | (2006.01) |
| H01G 5/40 | (2006.01) |
| H01H 36/00 | (2006.01) |

(52) U.S. Cl.
CPC ............... *H01G 5/16* (2013.01); *H01G 5/015* (2013.01); *H01G 5/40* (2013.01); *H01H 36/00* (2013.01); *H01H 2239/006* (2013.01)

(58) Field of Classification Search
CPC H01G 5/16; H01G 5/015; H01G 5/40; H01H 36/00; H01H 2239/006
See application file for complete search history.

(56) References Cited

U.S. PATENT DOCUMENTS

| | | | |
|---|---|---|---|
| 2011/0156930 A1* | 6/2011 | Chen ................. | H03K 17/9622 341/33 |
| 2011/0157066 A1* | 6/2011 | Waterbury .......... | G06F 3/04166 345/174 |
| 2012/0038583 A1* | 2/2012 | Westhues ............ | G06F 3/04166 345/174 |
| 2013/0113707 A1* | 5/2013 | Perski ................. | G06F 3/04162 345/168 |
| 2017/0010707 A1* | 1/2017 | Son ..................... | H05K 1/0296 |

* cited by examiner

*Primary Examiner* — Akm Zakaria
(74) *Attorney, Agent, or Firm* — Lindauer Law, PLLC

(57) ABSTRACT

An apparatus comprising an array of electrical conductors connected to circuitry that determines data indicative of objects at particular locations based on capacitance at junctions of conductors in the array. The apparatus comprises a first set of conductors arranged on a first substrate and a second set of conductors arranged on a second substrate to form an array. The first and second substrates are separated by an air gap within which the electrical conductors are positioned. Each conductor may be independently addressable, having a proximal end connected to readout electronics and a distal end that is not. The apparatus may be cut, at the ends distal to where the conductors connect to the circuitry, to fit a desired location, such as on a store shelf, while remaining operational.

20 Claims, 8 Drawing Sheets

FIELD-CONFIGURABLE CAPACITIVE MAT

PRIORITY

This patent application claims priority to the United States provisional application for patent having the application Ser. No. 63/261,035, filed Sep. 9, 2021, titled "Field Configurable Capacitive Mat". U.S. provisional application 63/261,035 is incorporated by reference herein in its entirety.

This patent application also claims priority to the United States provisional application for patent having the application Ser. No. 63/267,821, filed Feb. 10, 2022, titled "Field Configurable Capacitive Mat with Printed Conductors". U.S. provisional application 63/267,821 is incorporated by reference herein in its entirety.

BACKGROUND

Retailers, wholesalers, and other product distributors typically maintain an inventory of items that may be ordered, purchased, leased, borrowed, rented, viewed, and so forth, by clients or customers. For example, an e-commerce website may maintain inventory in a fulfillment center, warehouse, or other type of storage facility. When a customer orders an item, the item is picked from inventory, routed to a packing station, packed, and shipped to the customer.

As another example, physical stores maintain inventory in areas accessible to customers, such as in a shopping area, and customers can pick items from inventory and take the items to a cashier or automated system for purchase, rental, and so forth. Physical stores may also maintain inventory in a storage area, fulfillment center, or other facility that may be used to replenish inventory located in shopping areas, or to satisfy orders for items filled through other channels, such as an e-commerce website associated with the store.

Other entities, such as libraries, museums, rental centers, and so forth, may also maintain inventory in storage locations. In various cases, selected items may be picked from a current location and moved to a new location.

Monitoring the types and quantities of items at different locations within a facility may facilitate maintaining inventory, fulfilling orders for items, and management of other types of objects. In some cases, monitoring of items may be facilitated using sensors.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
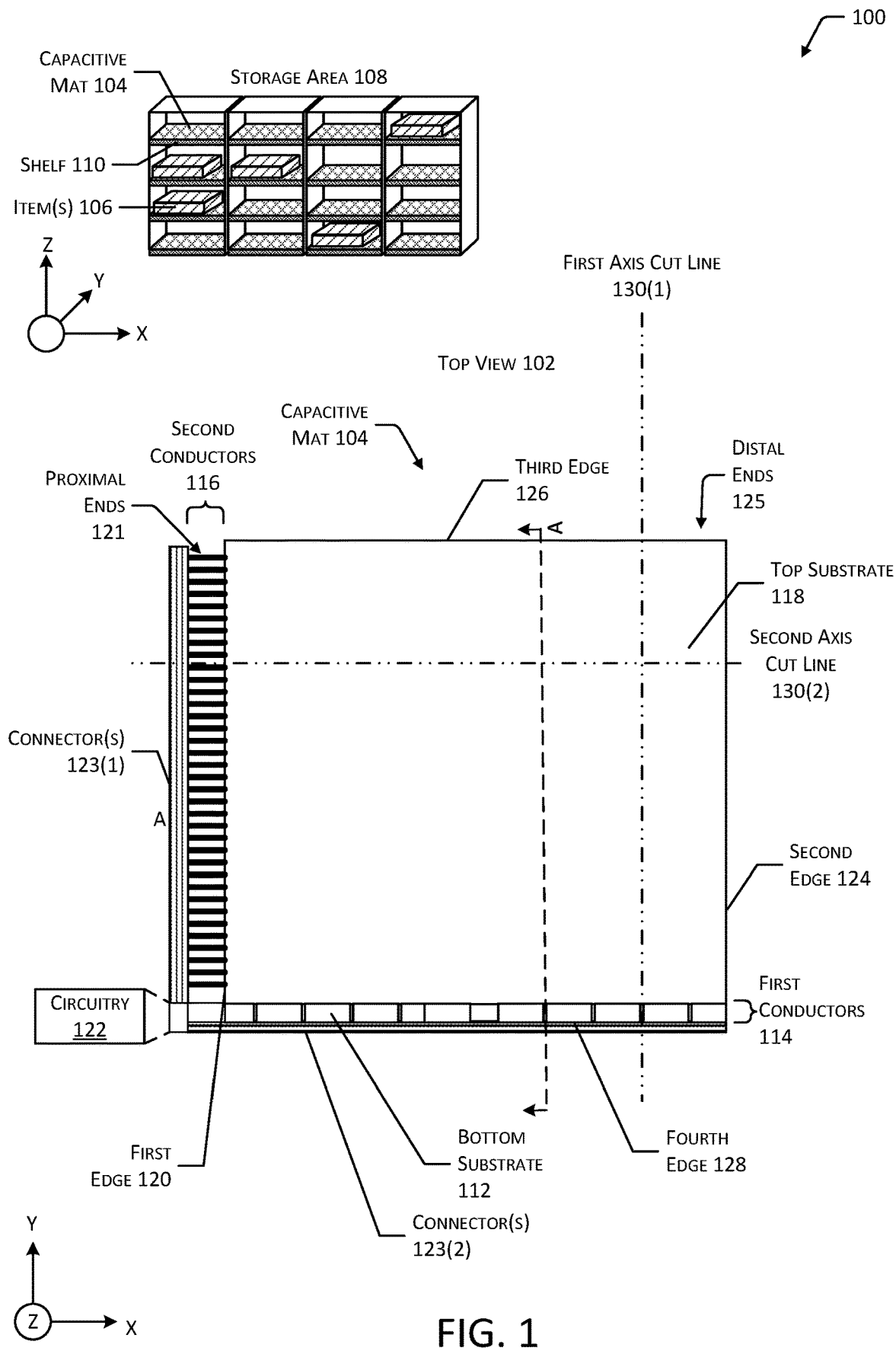
FIG. 1 is a diagram depicting a top view of an implementation of a capacitive mat within the present disclosure.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Described in this disclosure is a mat that is used as a sensor to acquire data about objects positioned on the mat. For example, when an object is placed on or removed from the mat, data acquired from the mat may indicate this change, which may be used to determine a location at which an object was placed or removed, and in some implementations, a weight or identity of the object. Conceptually, the mat may include three layers: a bottom substrate layer, a top substrate layer, and a middle layer of conductors. The bottom layer may include a substrate for placement on a surface, such as a shelf, floor, or other location where objects may be stored. In some implementations, the substrate may include a compressible (e.g., complaint or elastic) material, such as a closed-cell foam or rubber. In other implementations, the substrate may include a material that generally retains its shape, such as plastic, metal, and so forth.

A first set of conductors may be arranged on the bottom substrate. The conductors in the first set may be spaced from one another, defining a dielectric region between each conductor and adjacent conductors. In some implementations, the first set of conductors may include conductive wires that are arranged generally parallel to one another. In other implementations, the first set of conductors may include layers of conductive material, such as a silver or carbon ink conductor that is printed or otherwise adhered to the surface of the bottom substrate. In some implementations, the first set of conductors may be positioned on or adjacent to one or more other conductive materials. For example, a first layer of conductive material, such as a carbon ink conductive material, may be positioned on the surface of the bottom substrate. The first conductor, which may include an insulated wire or a layer of conductive material such as silver ink, may be placed over the first layer of conductive material. A second layer of conductive material may be placed on the opposing surface of the top substrate. As the material of the substrates is compressed by an object on the mat, the first and second layers of conductive material may move closer together and at least partially conform to the exterior of the insulated wire or other conductive material. When an object is removed from the mat, the compressed material may expand, enabling the layers of conductive material to move farther from one another. The first set of conductors, and in some implementations the layers of conductive material, may provide the capacitive mat with conductive areas, which may be spaced from one another, defining a non-conductive region between each conductive area and adjacent conductive areas.

A second set of conductors may be arranged above the first set of conductors. In some implementations, the second set of conductors may include conductive wires that are arranged generally parallel to one another. In other implementations, the second set of conductors may include layers of conductive material, such as a silver or carbon ink conductor that is printed or otherwise adhered to the surface of the top substrate. The second set of conductors may extend in a direction that differs from the direction in which the first set of conductors are arranged. For example, the second set of conductors may extend at an angle relative to the first set of conductors, such as an angle ranging from 20 to 160 degrees. In one implementation, the second set of conductors may be arranged generally perpendicular to the first set of conductors. The intersection between a particular conductor of the first set and a particular conductor of the second set may define a cell within the mat. Placement of objects on the mat may affect the distance between a particular conductor of the first set and a particular conductor of the second set, which may in turn affect a measured capacitance of a particular cell within the mat. The measured capacitance for the cells of the mat may therefore be used to determine locations of objects on the mat, and in some implementations, a weight of the objects at one or more locations. Because the conductors are positioned within an interior space between layers of foam or another substrate material, and the substrate material does not separate the conductors, the distance between the conductors due to placement of an item may be small, providing improved sensitivity and precision. In other implementations, the conductors in the first set and the conductors in the second set may be at other angles relative to one another, or generally parallel to one another. Any orientation of conductors in which placement of an object on the capacitive mat or removal of an object from the capacitive mat may change a distance between a conductor of the first set and a conductor of the second set may be used.

One or more layers of insulating material may separate the first set of conductors from the second set of conductors. For example, one or both sets of conductors may include insulated wires enclosed in rubber or another insulating material. In other implementations, one or both sets of conductors may be covered with a layer of dielectric material, such as a dielectric ink. For example, the first set of conductors on the bottom substrate may include a conductive material printed or otherwise adhered to the bottom substrate, or placed on the bottom substrate. The first set of conductors may be covered with a dielectric ink or other insulating material. Then, the second set of conductors may be placed over the insulating material. For example, the second set of conductors may include layers of conductive material such as carbon or silver ink, applied to the insulating material, or to a top substrate that is placed over the second set of conductors and the insulating material. In some implementations, a layer of dielectric material may be placed between the second set of conductors and the top substrate.

The top substrate placed over the second set of conductors may include a layer of closed cell foam or another compressible material. An interior space may separate the top substrate from the bottom substrate. The first and second sets of conductors, and the insulating material that separates the first set of conductors from the second set of conductors, may occupy at least a portion of the interior space. In some implementations, the interior space may include an air gap. In other implementations, the interior space may contain a different material or may be at least partially evacuated.

The conductors of the second set may include a proximal end that is connected to circuitry used to determine electrical characteristics associated with the conductors (e.g., capacitance, impedance, resistance, and so forth), and a distal end that is not connected to the circuitry. This arrangement may allow individual conductors or groups of conductors, or portions of particular conductors to be removed, such as by cutting the mat to a desired size or shape, without preventing the function of other conductors or of the circuitry to determine electrical characteristics of the other conductors. For example, if a device included wires or other conductors having a loop configuration, in which a proximal end and a distal end are both connected to circuitry, directly or indirectly via other conductors, cutting that device to remove a portion of the conductors would prevent the remaining portion from functioning properly. In contrast, implementations described herein may be cut to desired dimensions (e.g., length or width), and may be cut to any desired shape (e.g., rectangular, circular, other polygonal shapes, and so forth).

When an object is placed on the mat, the object applies a force to the compressible top substrate, which applies a force to particular conductors of the second set, decreasing the size of the space between the sets of conductors and moving those conductors closer to particular conductors of the first set. Movement of the conductor(s) may change a capacitance or other electrical characteristic, such as impedance or resistance, of one or more cells of the mat, each cell being defined by an intersection of one or more conductors of the first set and one or more conductors of the second set. As a result, the placement of the object at a particular location on the capacitive mat may be detected due to the change in capacitance. In a similar manner, when an object is removed from the mat, the conductors may move farther apart, which may also result in a change in capacitance at the particular location on the capacitive mat. The capacitance at one or more locations on the mat may therefore be used to determine the presence or absence of items at the locations.

Circuitry that is connected to at least a subset of the conductors may be used to determine the capacitance at one or more locations on the mat. In some implementations, the circuitry may be configured to determine a capacitance for different combinations of conductors. For example, a capacitance for multiple intersections of the first and second sets of conductors that extend across a larger region of the mat, and in some cases the entire mat, may be determined, and if this capacitance deviates from a threshold value or a previously-measured value by at least a threshold amount, additional capacitance measurements may be determined for one or more smaller regions of the mat, such as individual intersections of conductors or smaller groups of conductors. As a result, if an object is placed on or removed from the larger region of the mat, this may cause the capacitance to deviate from the threshold value. In response to this deviation, additional capacitance measurements may be determined from smaller regions of the mat, which may indicate particular locations at which objects were placed or removed.

The mat therefore includes an array of electrical conductors, in which individual conductors may be independently addressable using circuitry, or groups of conductors may be addressed to measure a capacitance associated with a larger area of the mat. For example, to reduce power usage, the circuitry may be configured to periodically determine a capacitance for an entire mat, or one or more groups of conductors that correspond to areas of the mat. If the determined capacitance deviates from a threshold value, such as a change in a previous capacitance value of at least a threshold amount, which may indicate the placement or removal of an item from the mat, the circuitry may be configured to then measure capacitance values for individual cells of the mat. Determined capacitance values may be used to generate output, which may be used to determine the placement of objects on the mat or the removal of objects from specific locations on the mat. Because the sets of conductors are positioned within an internal space between substrate layers and are not separated by substrate material, the distance between the sets of conductors may be small, increasing sensitivity and precision when determining capacitance values.

While implementations described herein determine capacitance values associated with particular conductors or sets of conductors, in other implementations, other electrical characteristics such as impedance or resistance may be determined. For example, a force applied to the top substrate that changes a distance between a conductor of the second set and a conductor of the first set may also cause a measured impedance or resistance associated with the conductors to change.

FIG. 1 is a diagram 100 depicting a top view 102 of an implementation of a capacitive mat 104 within the present disclosure. The capacitive mat 104 may be used to determine the presence of one or more items 106 that may be placed on or removed from the capacitive mat 104. For example, one or more capacitive mats 104 may be used in a storage area 108 where one or more items 106 may be stored. Continuing the example, a storage area 108 may include one or more shelves 110 or other surfaces where items 106 may be stored, and a capacitive mat 104 may be placed on one or more of the shelves 110 or other surfaces. As items are placed on or removed from various shelves 110, the capacitive mats 106 may act as sensors. For example, a signal indicative of a measured capacitance for a particular location on a capacitive mat 104 may indicate whether an item 106 is currently positioned at the particular location. Changes in measured capacitance for a particular location on a capacitive mat 104 may indicate whether an item 106 is placed on or removed from that location on the capacitive mat 104.

As described previously, the capacitive mat 104 may conceptually include a top layer, a middle layer of conductors, and a bottom layer. The bottom layer may include a bottom substrate 112, such as a layer of foam, rubber, or other type of generally compressible material. In other implementations, the bottom substrate 112 may include a material that generally retains its shape, such as plastic, metal, and so forth. For example, materials having a Shore Durometer measurement of 15-100A may be considered generally compressible, while materials having a Shore Durometer measurement of 50-80D may be considered materials that generally retain their shape.

A first set of conductors (first conductors 114) may be placed on the bottom substrate 112. In some implementations, the first conductors 114 may include conductive wires that are arranged generally parallel to one another. In other implementations, the first conductors 114 may include layers of conductive material, such as silver ink or carbon ink conductive materials that are printed, laminated, or otherwise connected to the top surface of the bottom substrate 112. In some implementations, the first conductors 114 may be placed on or adjacent to a layer of conductive material printed on the bottom substrate 112. For example, a first conductor 114 may include an insulated wire, which may be positioned over a layer of carbon or silver ink conductive material printed on the bottom substrate 112. As another example, the first conductor 114 may include a layer of silver ink or another conductive material printed on a layer of carbon ink conductive material. Each first conductor 114 and additional conductive material, if present, may define a conductive area that extends along the capacitive mat 104. The first conductors 114 (or conductive areas) may be spaced from one another to define a non-conductive region between adjacent first conductors 114 (or conductive areas).

A second set of conductors (second conductors 116) may be placed over the first conductors 114 or printed on or engaged with the top substrate 118, which may be placed over the first conductors 114. In some implementations, the second conductors 116 may include conductive wires that are arranged generally parallel to one another, and at an angle relative to the first conductors 114. For example, FIG. 1 depicts the second conductors 116 positioned generally perpendicular to the first conductors 114 such that each intersection between a particular first conductor 114 and a particular second conductor 116 may define a cell within the capacitive mat 104. Placement or removal of an item 106 at the location of a particular cell may cause the distance between the particular first conductor 114 and particular second conductor 116 to change, which may in turn cause a change in measured capacitance for the particular cell. Removal of an item from the capacitive mat 104 may similarly cause a change in the capacitance at a particular location on the capacitive mat 104. A coating or thin layer of insulating material may be placed between the first conductors 114 and second conductors 116. For example, the conductors may include wires that are enclosed in insulating material, or an insulating material such as dielectric ink may be applied between the sets of conductors. In other implementations, the first conductors 114 and second conductors 116 may be arranged at other angles relative to one another, or parallel to one another.

A top substrate 118 may be positioned over the second conductors 116. In some implementations, the top substrate 118 may include a layer of foam, rubber, or other type of generally compressible or compliant material. In other implementations, the top substrate 118 may include a generally rigid material that retains its shape. When an item 106 is placed at a particular location on the top substrate 118, the item 106 may apply a force to the top substrate 118, which may in turn apply a force to one or more first conductors 114 or second conductors 116 below the top substrate 118 at the location where the item 106 is placed. This force may change a distance between the first conductor(s) 114 and second conductor(s) 116 to change a capacitance for one or more cells of the capacitive mat 104. The capacitance may be used to determine the presence or absence of items 106 at one or more locations on the capacitive mat 104. Because the first conductors 114 and second conductors 116 are placed within an interior space between the bottom substrate 112 and top substrate 118, and the substrate material does not separate the sets of conductors, the distance between the first conductors 114 and second conductors 116 may be small, improving the sensitivity and precision of the capacitive mat 104. In other implementations, removal of an object from the capacitive mat 104 may enable the mat to expand a distance between conductors to increase.

FIG. 1 depicts an implementation of a capacitive mat 104 having a generally rectangular shape. For example, the capacitive mat 104 is shown having a first edge 120 from which the proximal ends 121 of the second conductors 116 extend to connect to circuitry 122 using one or more connectors 123(1). The first conductors 114 may also connect to the circuitry 122 using one or more connectors 123(2). The circuitry 122 may include a multiplexor, readout circuitry, or other types of circuitry or computing devices that determine a capacitance associated with particular conductors, groups of conductors, or portions of conductors and generate a signal or other type of output or data based on the determined capacitance. For example, the circuitry 122 may include switching circuitry to allow for individual conductors to be addressed such that a capacitance for any intersection between a first conductor 114 and second conductor 116 may be determined. While FIG. 1 depicts an implementation of a capacitive mat 104 in which a determined capacitance may indicate the presence or absence of items 106 at particular locations on the capacitive mat 104, and the placement or removal of items based on changes in capacitance, in other implementations, the circuitry 122 may determine other electrical characteristics, such as an impedance or a resistance, which may similarly be used to determine the presence or absence of items 106 at particular locations on the mat. While FIG. 1 depicts the circuitry 122 as a separate element from the capacitive mat 104, in some implementations, at least a portion of the circuitry 122 may be incorporated within the capacitive mat 104. For example, the circuitry 122 may include one or more flexible printed circuits that may be incorporated within the material of one or more layers of the capacitive mat 104. In some implementations, portions of the circuitry 122 within or external to the capacitive mat 104 may include components such as power sources, wireless communication components, and so forth.

FIG. 1 depicts the capacitive mat 104 having a second edge 124 opposite the first edge 120. The distal ends 125 of the second conductors 116 may extend toward the second edge 124. The depicted capacitive mat 104 also includes a third edge 126 perpendicular to the first edge 120 and second edge 124, and a fourth edge 128 opposite the third edge 126. While the depicted capacitive mat 104 is shown having a generally rectangular shape, in other implementations, the capacitive mat 104 may have other shapes, including square shapes, circular shapes, and other regular or irregular polygonal shapes.

In some implementations, the distal ends 125 of the second conductors 116 may not connect to the circuitry 122. This arrangement of second conductors 116 may enable the capacitive mat 104 to be cut to a desired shape or dimensions by removing a portion of the capacitive mat 104 from one or both of the second edge 124 or third edge 126. For example, due to this arrangement of second conductors 116, one or more conductors or portions of conductors may be removed from the capacitive mat 104 without preventing operation of the circuitry 122 to determine a capacitance for remaining portions of the capacitive mat 104. Continuing the example, FIG. 1 depicts a first axis cut line 130(1) extending vertically across the capacitive mat 104, illustrating that the portion of the capacitive mat 104 shown to the right of the first axis cut line 130(1) may be removed from the capacitive mat 104 without preventing operation of the circuitry 122 to determine a capacitance for remaining portions of the capacitive mat 104. As another example, FIG. 1 depicts a second axis cut line 130(2) extending horizontally across the capacitive mat 104, illustrating that the portion of the capacitive mat 104 shown above the second axis cut line 130(2) may be removed from the capacitive mat 104 without preventing operation of the circuitry 122 to determine a capacitance for remaining portions of the capacitive mat 104.

Figure 2A:
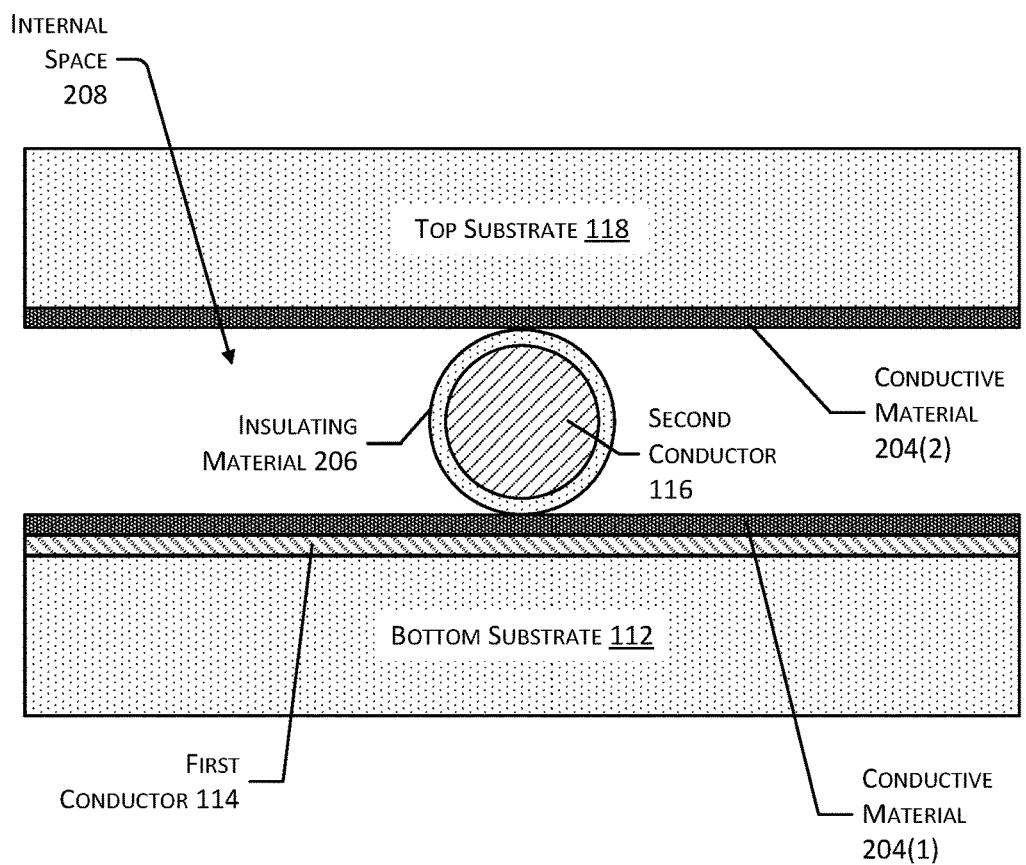
FIG. 2A is a diagram depicting a side cross-sectional view of the capacitive mat along line A-A of FIG. 1.

FIG. 2A is a diagram 200 depicting a side cross-sectional view 202 of a portion of the capacitive mat 104 along line A-A of FIG. 1. As described with regard to FIG. 1, the capacitive mat 104 may conceptually include a top layer, a middle layer of conductors, and a bottom layer. The bottom layer may include a bottom substrate 112 along which the first conductors 114 may be arranged. In some implementations, the first conductors 114 may include conductive wires that are placed on the bottom substrate 112. In other implementations, the first conductors 114 may include one or more layers of conductive material, such as carbon ink or silver ink, applied to the bottom substrate 112. For example, FIG. 2A depicts the first conductor 114 and a first layer of conductive material 204(1), such as carbon ink conductive material, painted, laminated, or otherwise applied to the bottom substrate 112. The first conductor 114 may be placed on or adjacent to the bottom substrate 112, or in other implementations the first layer of conductive material 204(1) may be placed on the bottom substrate 112 and the first conductor 114 may be placed on the first layer of conductive material 204(1). In other implementations, one of the first layer of conductive material 204(1) or the first conductor 114 may be omitted and a single layer of material may be used as the first conductor 114. In some implementations, an insulating material 206, such as insulation around a conductive wire, or a dielectric material such as dielectric ink, may be used to separate the first conductor 114 from the second conductor 116.

As shown in FIG. 2A, one or more second conductors 116 may be placed over the first conductor(s) 114. In some implementations, an insulating material 206 may separate the second conductors 116 from the first conductor 114. For example, the second conductors 116 may include a set of insulated wires that are arranged parallel to one another. In other implementations, one or more of the second conductors 116 may include layers of conductive material applied to the top substrate 118, such as a silver ink conductive material. In some implementations, a second layer of conductive material 204(2) may be applied over the second conductor 116 (e.g., on the top substrate 118). In other implementations, one of the second layer of conductive material 204(2) or the second conductor 116 may be omitted. An internal space 208 may separate the top substrate 118 from the bottom substrate 112, with the first conductors 114 and second conductors 116 positioned in the internal space 208. Application of a force to the top substrate 118, such as a force caused by placement of an item 106 on the top substrate 118, may decrease a distance between the second and one or more of the first conductors 114. In implementations where the second conductor 116 includes an insulated wire and the top substrate 118 includes a compressible material, a force applied to the top substrate 118 may cause at least a portion of the first conductor 114 to conform to the shape of the insulated wire, such as by at least partially encircling the circumference of the second conductor 116. While FIG. 2A depicts the second conductors 116 as a wire having a generally cylindrical cross-sectional shape, in other implementations, conductors having any cross sectional shape, such as generally flat or rectangular shapes, may be used.

In the configuration shown in FIG. 2A, when an item 106 is placed on the top substrate 118, the top substrate 118 may be compressed, the size of the internal space 208 may be decreased as the distance between the second conductor 116 and the first conductor 114 decreases. In some cases, the first conductor 114 may at least partially conform to the shape of the second conductor 116. In other implementations, the second conductor 116 may include a layer of material that may at least partially conform to the shape of the first conductor 114. Reducing the distance between the second conductor 116 and the first conductor 114 in this manner may change a capacitance associated with the intersection between the second conductor 116 and the first conductor 114, which may be used to determine the presence or absence of an item 106 at a particular location on the capacitive mat 104.

Figure 2B:
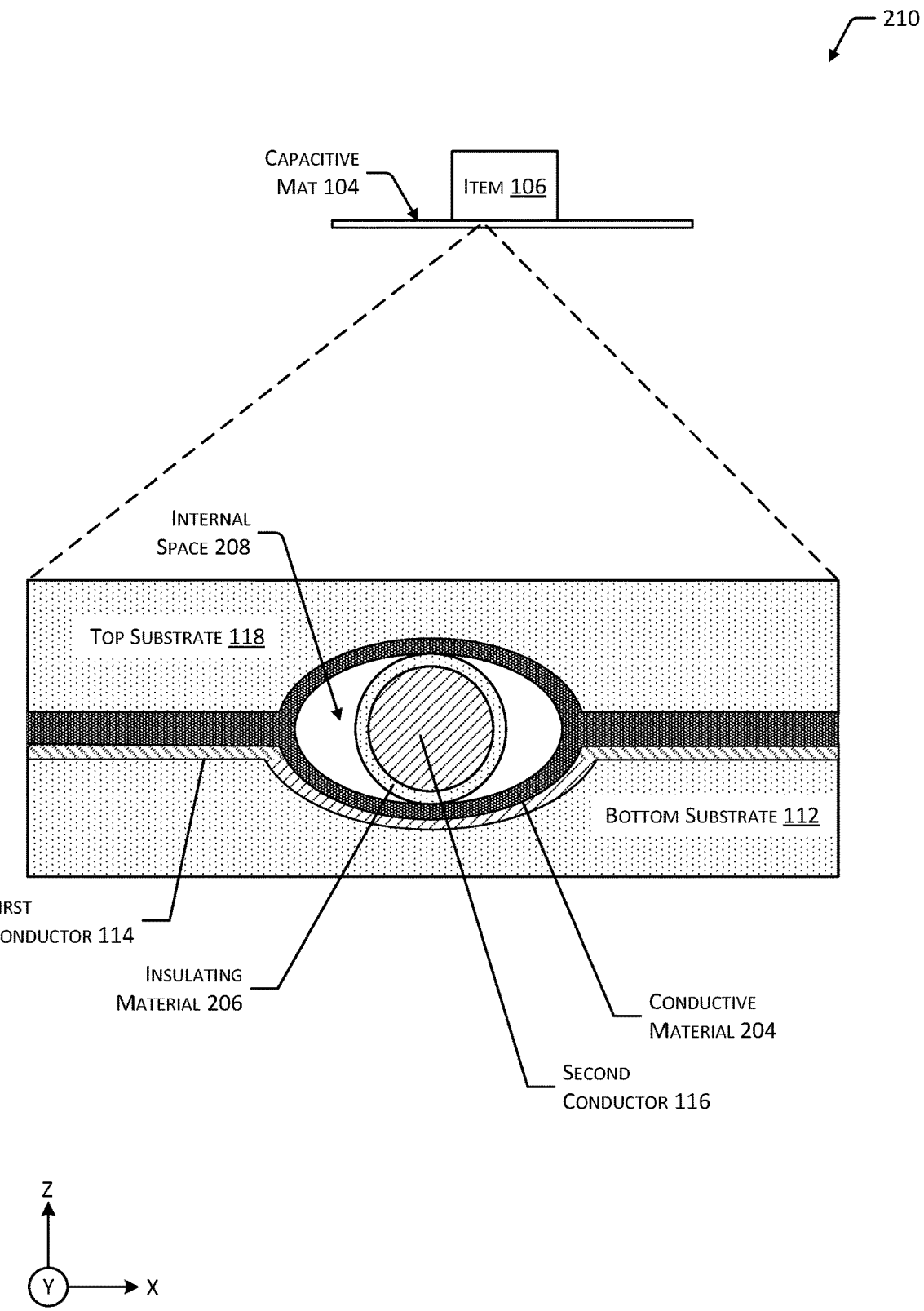
FIG. 2B is a diagram depicting the capacitive mat of FIG. 2A under application of a force from the weight of an item on the capacitive mat.

FIG. 2B is a diagram 210 depicting the capacitive mat 104 of FIG. 2A under application of a force from the weight of an item 106 on the capacitive mat 104. As described with regard to FIG. 2A, when an item 106 is placed on the top substrate 118, the weight of the item 106 may compress the top substrate 118, displace the top substrate 118 toward the bottom substrate 112, and decrease the size of the internal space 208. The second conductor 116 may be moved toward the first conductor 114 due to the force from the weight of the item 106, decreasing a distance between the second conductor 116 and the first conductor 114. If the second conductor 116 includes a material that generally retains its shape, such as a conductive wire, and if the first conductor 114 includes a material that is able to deform, such as a layer of silver ink or another type of conductive material 204, the first conductor 114 may partially conform to the shape of the exterior of the second conductor 116, such as by at least partially enclosing the circumference of the second conductor 116, while retaining a portion of the internal space 208 adjacent to the second conductor 116. In other implementations, if the first conductor 114 includes a material that generally retains its shape, such as a wire, and the second conductor 116 includes a layer of material that is able to deform, such as conductive ink, the second conductor 116 may at least partially conform to the shape of the first conductor 114. The insulating material 206 may separate the first conductor 114 from the second conductor 116, preventing contact between the first conductor 114 and the second conductor 116.

When the top substrate 118 moves toward the bottom substrate 112, this movement may also move the portion of the conductive material 204 positioned on the top substrate 118 toward the conductive material 204 positioned on the bottom substrate 112. In cases where the conductive material 204 includes a deformable material, such as a carbon ink conductive material, the conductive material 204 may partially conform to the shape of the second conductor 116, such as by at least partially enclosing the circumference thereof. In some cases, one or more of the top substrate 118 or bottom substrate 112 may also deform and at least partially conform to the shape of the second conductor 116.

The change in distance between the second conductor 116 and the first conductor 114 may change a capacitance associated with the intersection between the first conductor 114 and the second conductor 116. This capacitance may be used to determine the presence or absence of one or more items 106 at a particular location on the capacitive mat 104. In some implementations, the measured capacitance value may be used to determine an approximate weight of one or more items 106. In still other implementations, other electrical characteristics such an impedance or resistance may be determined in addition to or in place of the capacitance.

Figure 3:
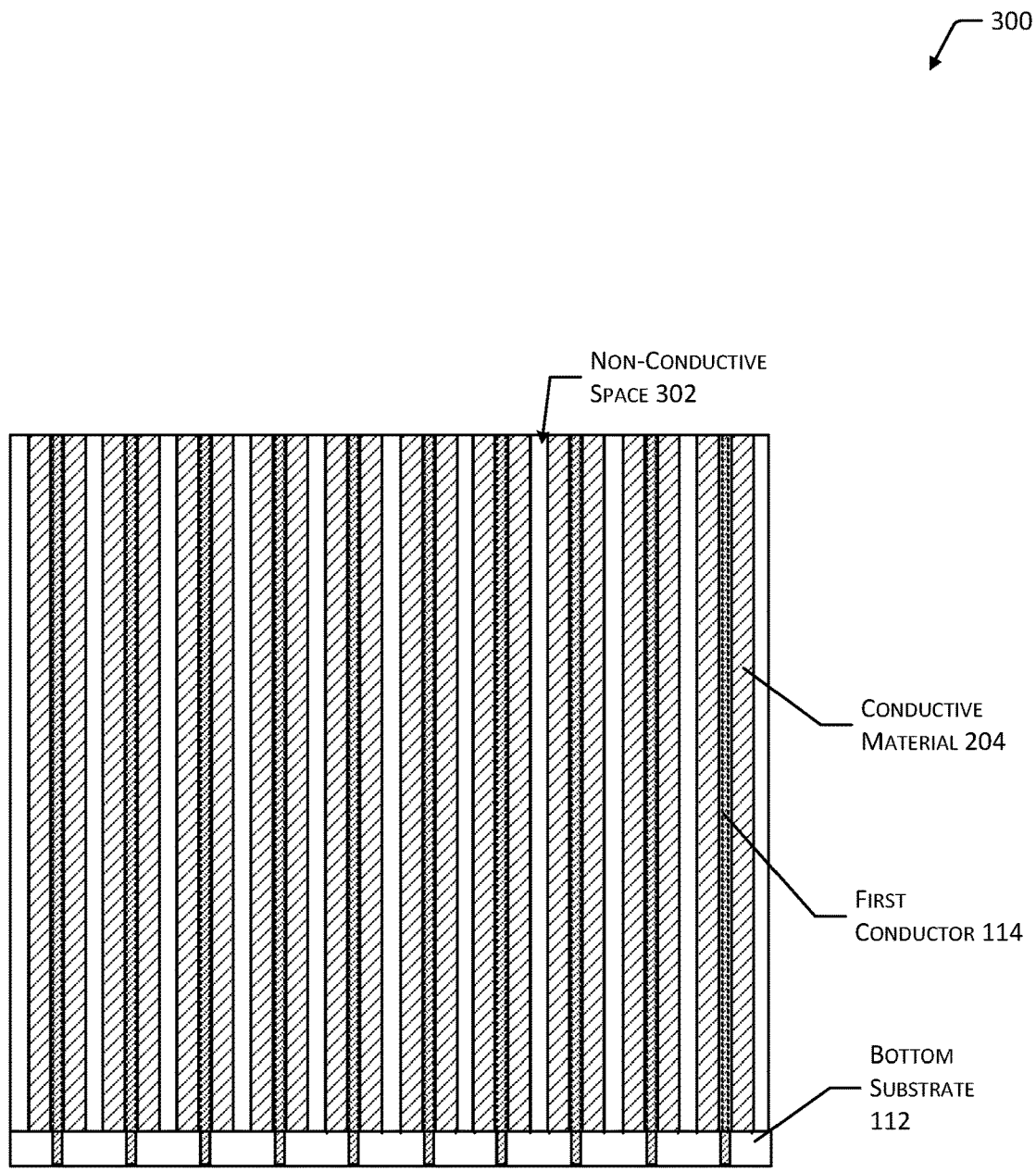
FIG. 3 is a diagram depicting an implementation of a bottom layer of the capacitive mat of FIG. 1.
Figure 3:
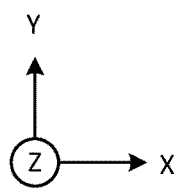

FIG. 3 is a diagram 300 depicting an implementation of a bottom layer of the capacitive mat 104 of FIG. 1. As described with regard to FIG. 1, a bottom layer of the capacitive mat 104 may include a bottom substrate 112, which may include a layer of compressible or compliant material, or in other implementations, a layer of material that generally retains its shape. A first set of conductors, of which a first conductor 114 is labeled for illustrative purposes, may be arranged on the bottom substrate 112. In some implementations, one or more of the first conductors 114 may be placed on or adjacent to a layer of conductive material 204 on the bottom substrate 112, to define a conductive area having a width across the capacitive mat 104 that is greater than the width of the first conductor 114. As shown in FIG. 3, the first conductors 114 may be arranged generally parallel to one another, with a non-conductive space 302 between each first conductor 114 or conductive area and at least one adjacent first conductor 114 or conductive area.

In some implementations the first conductors 114 may include a conductive wire having a first width relative to the bottom substrate 112. The conductive material 204 having a second width greater than the first width of the first conductor 114 may include a layer of conductive material, such as a carbon ink conductive material, applied to the interior surface of the bottom substrate 112. In other implementations, the first conductors 114 may include a layer of conductive material, such as silver ink conductive material, having a width that is less than that of the conductive material 204 or equal to that of the conductive material 204. In still other implementations, use of a separate conductive material 204 may be omitted, and the conductive areas on the bottom substrate 112 may be defined by first conductors 114 that include a single material, such as a layer of silver ink conductive material. In some implementations, at least one of the first conductor 114 or the conductive material 204 may function as return path conductors for determining the capacitance at one or more locations along the length of the associated first conductor 114. In some implementations, an additional layer of the second conductive material 204 may be positioned above the first conductors 114, such as on the top substrate 118. A force applied to the top substrate 118, such as by placement of an item 106 thereon, may cause the portion of conductive material 204 above the first conductors 114, if present, to move toward the first conductor 114 and the conductive material 204 on the bottom substrate 112. For example, if the first conductive material 204(1) includes an insulated wire, application of a force to the top substrate 118 may cause the conductive material 204 on one or more of the top substrate 118 or bottom substrate 112 to at least partially conform to the shape of the wire, such as by at least partially encircling the circumference of the wire.

Figure 4:
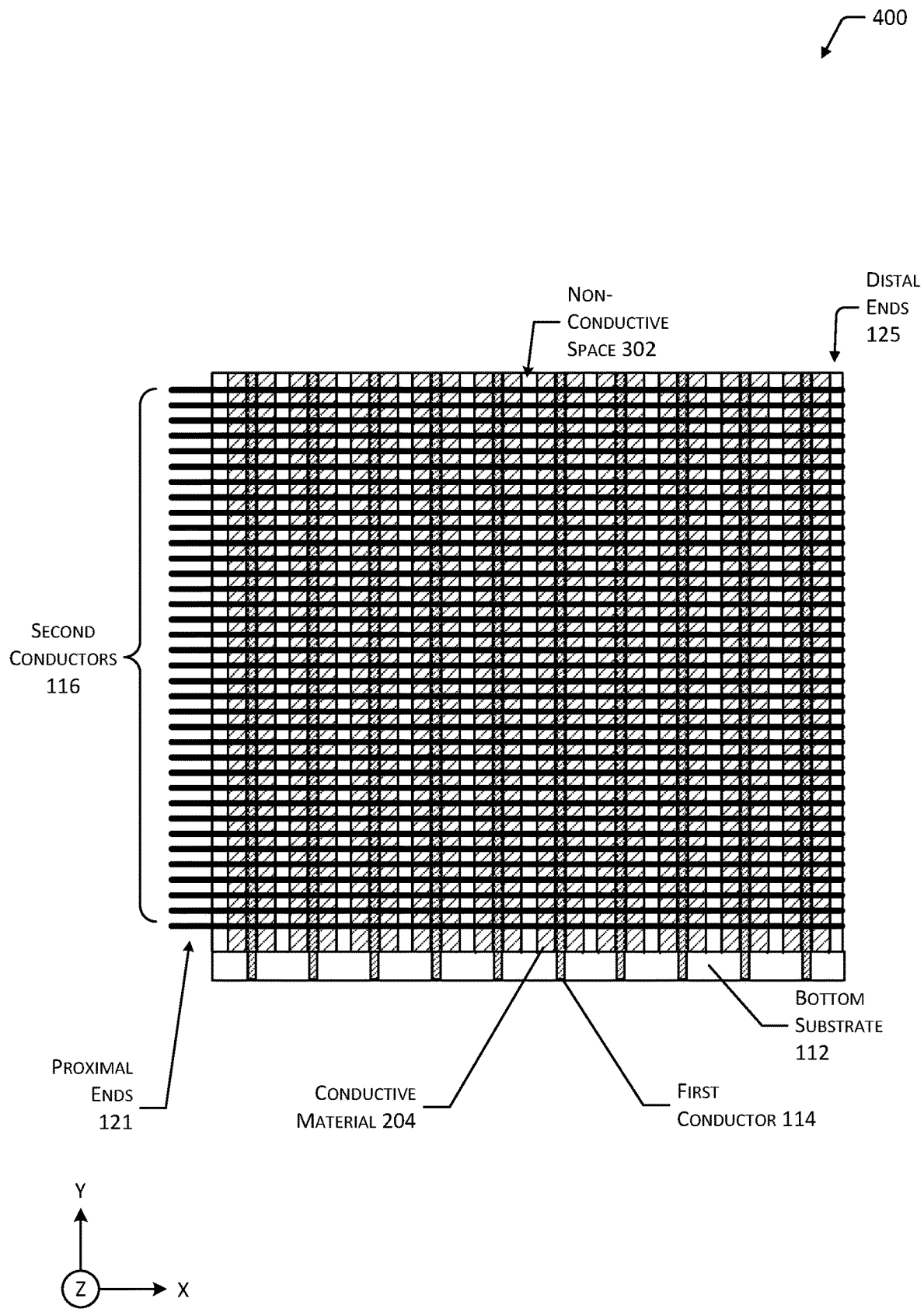
FIG. 4 is a diagram depicting the bottom layer shown in FIG. 3 with a middle layer of conductors arranged on the bottom layer.

FIG. 4 is a diagram 400 depicting the bottom layer shown in FIG. 3 with a middle layer of conductors arranged on the bottom layer. As described with regard to FIG. 3, the bottom layer may include the bottom substrate 112, which may include a layer of compressible or compliant material, or in other implementations, a layer of material that generally retains its shape. A set of first conductors 114 may be arranged on the bottom substrate 112, each first conductor 114 spaced from one or more adjacent first conductors 114 by a non-conductive space 302, such that the first conductors 114 define conductive regions along the bottom substrate 112, while the non-conductive spaces 302 separate the conductive regions.

In some implementations, the first conductors 114 may be positioned on or adjacent to an additional conductive material 204, such as a layer of carbon ink or silver ink conductive material. In some implementations, the conductive material 204 may extend along a larger portion of the width of the bottom substrate 112 than the first conductor 114, defining conductive areas along the bottom substrate 112 between the non-conductive spaces 302. In some implementations, the first conductor 114 may function as a return path conductor for determining the capacitance at one or more locations along the length of the associated first conductor 114.

A set of second conductors 116 is shown positioned over the first conductors 114. In the implementation shown in FIG. 4, the second conductors 116 may each include a conductive wire positioned at an angle relative to one or more of the first conductors 114. In other implementations, the second conductors 116 may include a conductive material 204 applied to the top substrate 118, such as a carbon ink or silver ink conductive material. Positioning the second conductors 116 at an angle relative to the first conductors 114 enables each intersection between a second conductor 116 and a first conductor 114 to function as a cell within the capacitive mat 104 from which a capacitance may be determined based at least in part on the distance between the particular second conductor 116 and the particular first conductor 114. FIG. 4 depicts the second conductors 116 arranged generally perpendicular to the first conductors 114. In other implementations, the second conductors 116 may be arranged at any angle relative to the first conductors 114. For example, the second conductors 116 may be positioned at an angle ranging from 20 to 160 degrees relative to the first conductors 114. An insulating material may separate the first conductors 114 from the second conductors 116. For example, one or both sets of conductors may include insulated wires. In other implementations, a layer of insulating material 206, such as dielectric ink or another generally non-conductive material may be placed on at least one surface of one or both of the first conductors 114 or the second conductors 116. In some implementations, as shown in FIG. 2A, a layer of conductive material 204(2) may be placed between the first conductors 114 and the second conductors 116, and an insulating material 206 may separate the second conductors 116 from the conductive material 204(2). While FIG. 4 depicts the second conductors 116 arranged at an angle relative to the first conductors 114, any arrangement of conductors in which placement of an object on a capacitive mat 104 or removal of an object from the capacitive mat 104 may change a distance between a first conductor 114 and second conductor 116 may be used, including arrangements in which one or more first conductors 114 are generally parallel to one or more second conductors 116.

Each second conductor 116 is shown having a proximal end 121 at the first edge 120 of the capacitive mat 104, which may connect to circuitry 122 as shown in FIG. 1. Each second conductor 116 is also shown having a distal end 125 opposite the proximal end 121 (e.g., at the second edge 124 of the capacitive mat 104), which does not connect to the circuitry 122. This arrangement of second conductors 116 may enable the capacitive mat 104 to be cut to a desired shape or dimensions by removing a portion of the capacitive mat 104 from one or both of the second edge 124 or third edge 126. For example, because both ends of the second conductors 116 do not connect to the circuitry 122, one or more of the second conductors 116 may be removed or cut without preventing operation of the circuitry 122 to determine a capacitance using the remaining conductors or portions of conductors.

Figure 5:
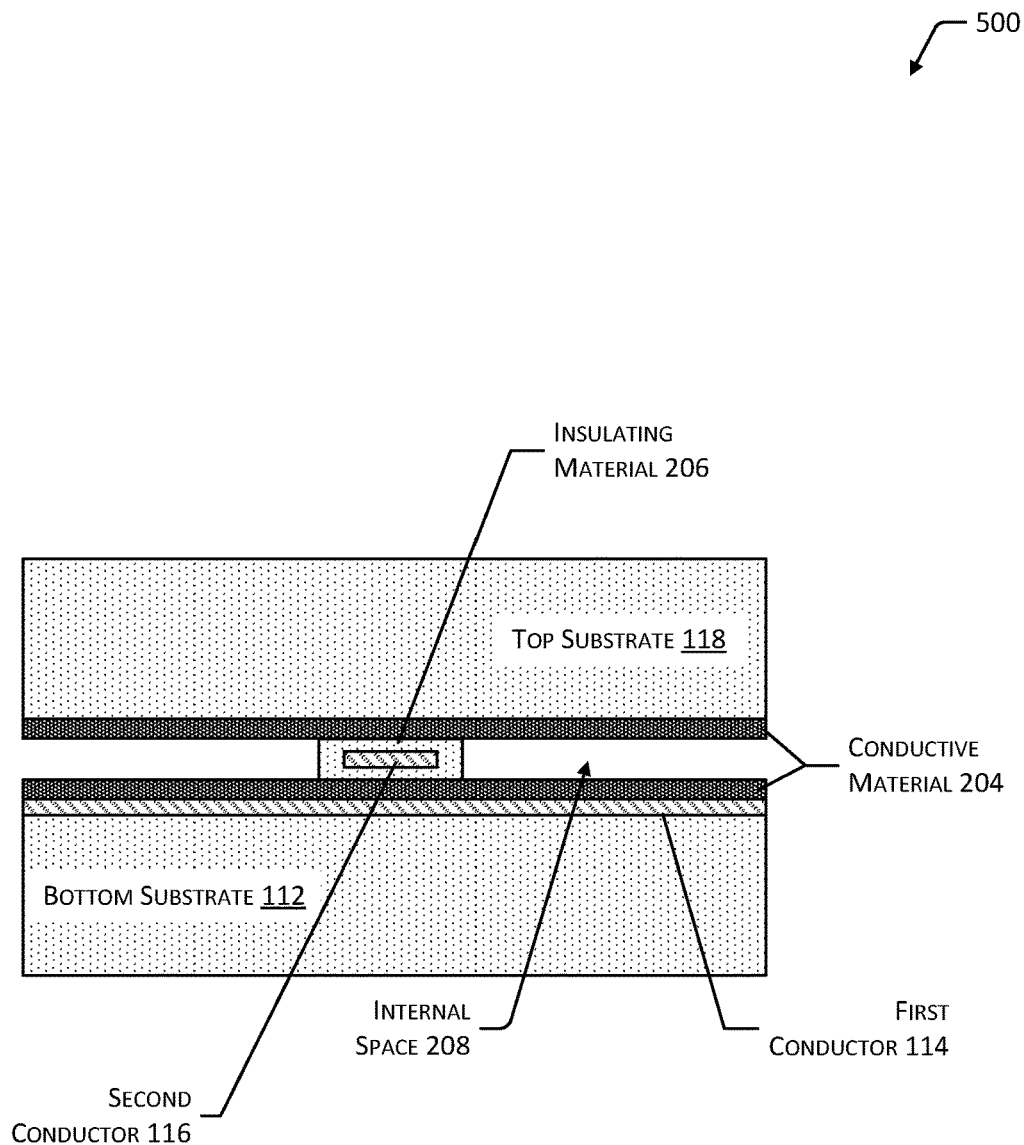
FIG. 5 is a diagram depicting a side cross-sectional view of an alternate implementation of a capacitive mat that includes a layer of conductive material having a rectangular cross-sectional shape in place of a wire.

FIG. 5 is a diagram 500 depicting a side cross-sectional view of an implementation of a capacitive mat 104 that includes a layer of conductive material 204 having a rectangular cross-sectional shape in place of a wire. For example, the bottom substrate 112 may include a layer of the conductive material 204, such as carbon ink or other type of conductive material, positioned thereon. The first conductor 114 may include a layer of conductive material 204, such as a silver ink conductor or other type of conductive material. The second conductor 116 may have a generally flat or rectangular cross-sectional shape, which may enable the capacitive mat 104 to have a shorter height and greater structural integrity. Use of a printed or laminated conductive material 204 may enable more efficient manufacture of the capacitive mat 104.

As described with regard to FIG. 2A, a layer of conductive material 204 may also be positioned on the top substrate 118. In other implementations, the conductive material 204 on one or more of the top substrate 118 or bottom substrate 112 may be omitted. In some implementations, the first conductor 114 may comprise a layer of silver ink conductive material, or another type of conductive material 204. In other implementations, the first conductor 114 may be positioned on the top substrate 118. In still other implementations, the first conductor 114 may include a conductive wire.

As described with regard to FIG. 2B, in some implementations, application of a force to the top substrate 118, such as from an item 106 placed on the capacitive mat 104, may cause the first conductor 114 and at least a portion of the conductive material 204 to at least partially deform relative to the shape of the second conductor 116, reducing a distance between the second conductor 116 and the first conductor 114. A change in distance between the second conductor 116 and the first conductor 114 may change a capacitance associated with the intersection of the first conductor 114 and the second conductor 116. The capacitance may in turn be used to determine the presence or absence of items 106 at one or more locations on the capacitive mat 104. For example, a change in capacitance may be detected when an item is placed on or removed from a particular location on the capacitive mat 104.

Figure 6:
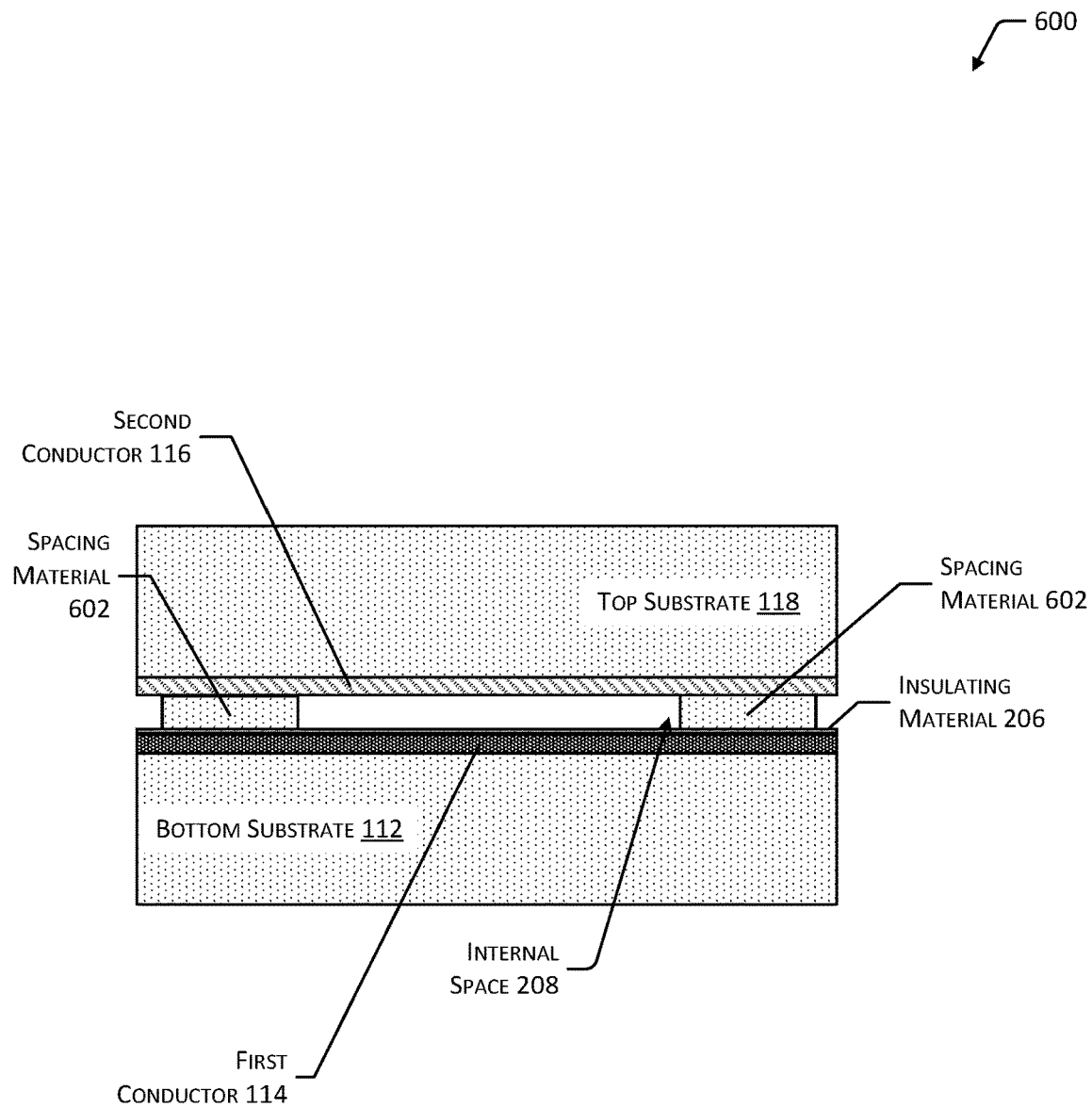
FIG. 6 is a diagram depicting a side cross-sectional view of an implementation of a capacitive mat that includes two layers of conductive material separated by an insulating material and a spacing material to create an internal space between the layers of conductive material.

FIG. 6 is a diagram 600 depicting a side cross-sectional view of an implementation of a capacitive mat 104 that includes two layers of conductive material 204 separated by an insulating material 206 and a spacing material 602 to create an internal space 208 between the layers of conductive material 204. In some implementations, the first conductor 114 and second conductor 116 may include layers of conductive material, such as carbon ink or silver ink material, printed, laminated, or otherwise applied to substrate layers of the capacitive mat 104. For example, FIG. 6 depicts the first conductor 114 as a layer of material applied to the bottom substrate 112, and the second conductor 116 as a layer of material applied to the top substrate 118. A layer of insulating material 206, such as dielectric ink, or another type of non-conductive material, may be positioned between the first conductor 114 and the second conductor 116. While FIG. 6 depicts the insulating material 206 positioned adjacent to the first conductor 114, in other implementations, insulating material 206 may be positioned adjacent to the second conductor 116, or adjacent to both conductors.

Because both conductors are positioned on the interior surfaces of the bottom substrate 112 and top substrate 118, within an internal space 208 between the substrate layers, no substrate material is present between the conductors. As a result, when an item 106 is placed on the capacitive mat 104, the size of the internal space 208 may be reduced as the top substrate 118 is compressed and the second conductor 116 is moved toward the first conductor 114. Because the distance between the conductors is able to be small due to the absence of substrate material between the conductors, the capacitive mat 104 may be capable of high sensitivity and precision.

One or more pieces of a spacing material 602, such as plastic, one or more layers of dielectric ink, or another generally non-conductive material may be positioned between the conductors to maintain the internal space 208. The spacing material 602 may be generally non-compressible. However, placement of an object on the capacitive mat 104 may displace the top substrate 118 and second conductor 116 toward the first conductor 114. While the insulating material 206 may prevent contact between the conductors, the distance between the conductors may be extremely small due to the absence of other material between the conductors.

Figure 7:
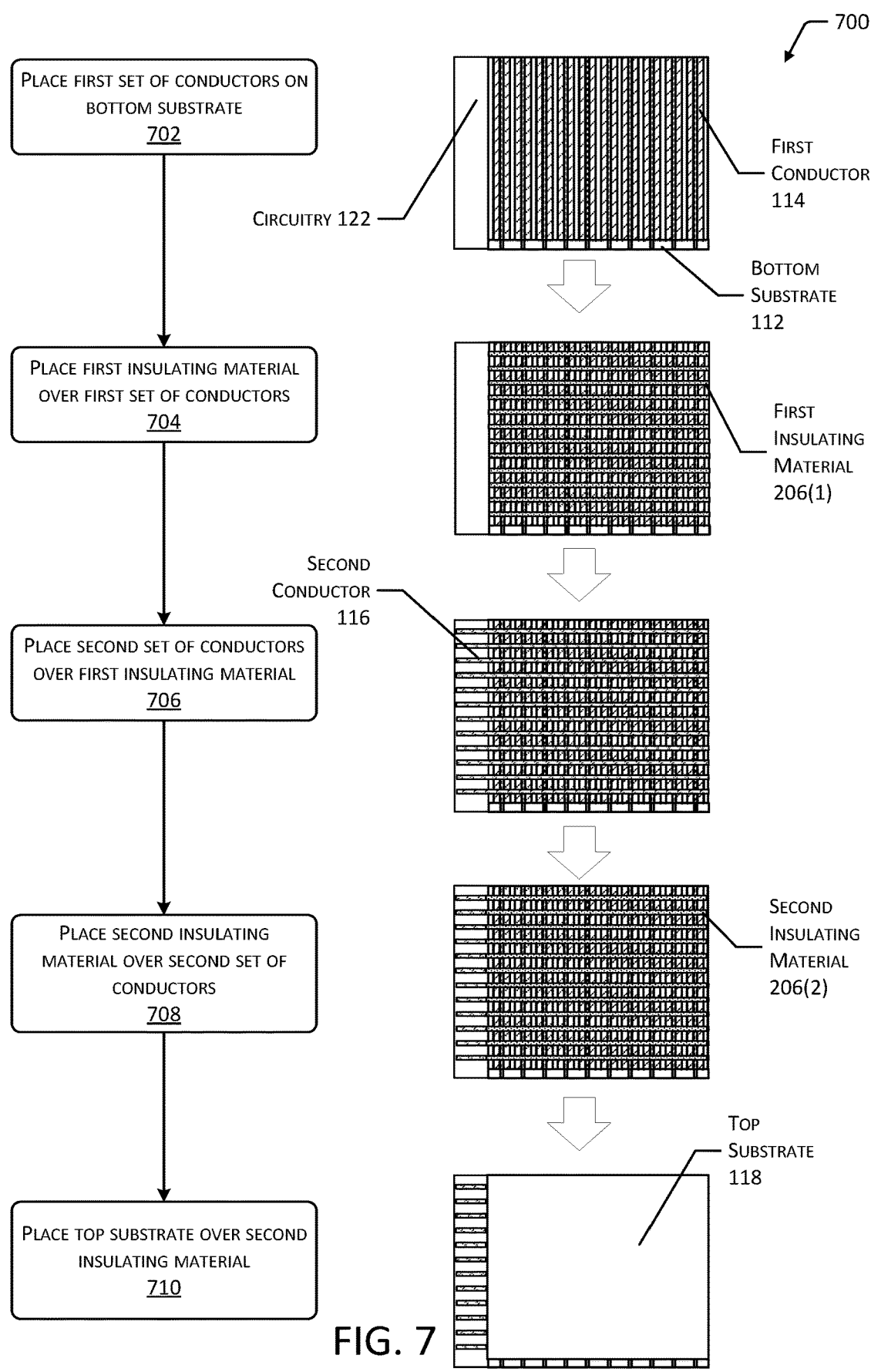
FIG. 7 is a diagram depicting an implementation of a process for assembling an implementation of a capacitive mat within the present disclosure.

FIG. 7 is a diagram 700 depicting an implementation of a process for assembling a capacitive mat 104 within the present disclosure. At 702, a first set of conductors may be placed on a bottom substrate 112. For example, a conductive material 204 such as a layer of carbon or silver ink may be printed, laminated, or otherwise applied to a surface of the bottom substrate 112 to define conductive areas that are separated from other conductive areas by a non-conductive space 302. In other cases, conductive wires may be arranged on the bottom substrate 112. In still other implementations, a combination of conductive materials 204 may be used, such as a conductive wire or layer of a first conductive material such as silver ink, arranged over a conductive area that includes a layer of a conductive material, such as carbon ink, that is applied to the bottom substrate 112. In some implementations, the first conductors 114 may be arranged generally parallel to one another, however, in other implementations, other configurations of first conductors 114 may be used. In a similar manner, a conductive material, such as a layer of carbon ink conductive material, may be applied to the top substrate 118, as shown in FIGS. 2A and 2B, such that when the top substrate 118 is positioned over the bottom substrate 112, regions of conductive material on the top substrate 118 are positioned opposite regions of conductive material on the bottom substrate 112.

At 704, a first insulating material 206(1) may be applied over the first set of conductors. For example, a dielectric ink or another type of insulating (e.g., generally non-conductive) material may be positioned over at least a portion of the first conductors 114. The first insulating material 206(1) may not necessarily cover the entirety of the first conductors 114. For example, FIG. 7 depicts the first insulating material 206(1) arranged in lines that are spaced apart from one another and are generally perpendicular to the first conductors 114. Continuing the example, the portions of the bottom substrate 112 over which the first insulating material 206(1) are placed may correspond to areas where a second conductor 116 is to be placed.

At 706, a second set of conductors may be placed over the first insulating material 206(1). For example, a layer of silver ink conductive material, or another conductive material, may be applied over the first insulating material 206(1), in parallel lines that are generally perpendicular to the first conductors 114. In some implementations, proximal ends 121 of the second conductors 116 may extend beyond the first insulating material 206(1) to connect to circuitry 122. As described with regard to FIGS. 1 and 4, in some implementations, the distal ends 125 of the second conductors 116 may not be connected to the circuitry 122, which may enable the conductive mat 104 to be cut to a desired shape or dimensions, or for one or more conductors, groups of conductors, or portions of conductors to be removed without preventing the circuitry 122 from determining a capacitance for other conductors, groups of conductors, or portions of conductors that are not removed from the capacitive mat 104.

At 708, a second insulating material 206(2) may be placed over the second set of conductors. For example, the second insulating material 206(2) may include a layer of dielectric ink or another type of generally non-conductive material.

At 710, a top substrate 118 may be placed over the second insulating material 206. As described at 702, in some implementations, the top substrate 118 may include a layer of conductive material 204 that provides the top substrate 118 with conductive regions that are positioned opposite corresponding conductive regions on the bottom substrate 112. The second insulating material 206(2) may prevent contact between the second conductors 116 and conductive material 204 on the top substrate 118. As described previously, due to the second conductors 116 having proximal ends 121 connected to the circuitry 122 and distal ends 125 that are not connected to the circuitry 122, the capacitive mat 104 may be cut to a desired shape or dimensions by removing portions of the mat from the second edge 124 opposite the proximal ends 121 of the second conductors 116, and from the third edge 126.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A mat for determining position of an object relative to a surface, the mat comprising:
   circuitry;
   a first substrate for placement on the surface, wherein the first substrate is formed from a compressible material;
   a first set of conductors on the first substrate, wherein a space separates each conductor of the first set from adjacent conductors of the first set, and wherein the each conductor of the first set of conductors is arranged in a first direction across the first substrate;
   a second set of conductors positioned on the first set of conductors, wherein at least a first conductor and a second conductor of the second set of conductors each have a proximal end that is connected to the circuitry, wherein each conductor of the second set of conductors extends in a second direction that differs from the first direction, and wherein the second set of conductors is insulated from electrical contact with the first set of conductors; and
   a second substrate positioned on the second set of conductors, wherein the second substrate is formed from the compressible material;
   wherein the circuitry is configured to:
      determine a change in capacitance associated with a first plurality of conductors of the first set of conductors and a second plurality of conductors of the second set of conductors;

in response to the change in capacitance, determine a capacitance associated with a first intersection of a third conductor of the first set of conductors and the first conductor of the second set of conductors;

generate first output indicative of the capacitance and second output indicative of the first intersection;

determine a location on the mat that is associated with the first conductor of the second set and the third conductor in the first set; and determine placement or removal of an item from the location.

2. The mat of claim 1, further comprising an internal space between the first substrate and the second substrate, wherein: a weight of one or more objects applies a force to the second substrate to decrease a size of the internal space and move the first conductor of the second set toward the third conductor of the first set, and movement of the first conductor of the second set toward the third conductor of the first set changes the capacitance associated with the first intersection.

3. The mat of claim 1, wherein the first set of conductors are parallel to one another, and the second set of conductors are parallel to one another and arranged at an angle ranging from 20 to 160 degrees relative to the first set of conductors.

4. A device comprising:

a first set of conductors arranged in a first direction;

a second set of conductors positioned adjacent to the first set and arranged in a second direction that differs from the first direction, wherein at least a first conductor and a second conductor of the second set each have a proximal end that connects to circuitry, wherein the second set of conductors is insulated from electrical contact with the first set of conductors; and a first substrate positioned adjacent to the second set of conductors, wherein the second set of conductors are positioned between the first substrate and the first set of conductors;

wherein the circuitry is configured to:

generate a signal based on a first capacitance associated with the first conductor of the second set and a third conductor of the first set;

wherein a first space separates the third conductor of the first set from a fourth conductor of the first set; and wherein the first capacitance associated with the first conductor of the second set and the third conductor of the first set is independent from a second capacitance associated with the fourth conductor of the first set based on the first space between the third conductor of the first set and the fourth conductor of the first set.

5. The device of claim 4, further comprising a second substrate, wherein the first set of conductors are arranged on the second substrate between the second substrate and the second set of conductors, and wherein the first substrate is more compressible than the second substrate.

6. The device of claim 4, further comprising a second substrate adjacent to the first set of conductors, wherein the first set of conductors is positioned between the second substrate and the second set of conductors, and wherein the first substrate and the second substrate include a compressible material.

7. The device of claim 4, further comprising:

a second substrate beneath the first set of conductors, wherein the first set of conductors is positioned between the second substrate and the second set of conductors, wherein the third conductor of the first set is positioned between the first substrate and the second substrate, and wherein the third conductor of the first set has a first width relative to a first dimension of the first substrate; and a layer of conductive material positioned on a surface of the first substrate between the third conductor of the first set and the first substrate, wherein the layer of conductive material has a second width relative to the first dimension of the first substrate, and wherein the second width is greater than the first width.

8. The device of claim 4, further comprising:

a second substrate beneath the first set of conductors;

a second space between the first substrate and the second substrate, wherein the first set of conductors is positioned between the second substrate and the second set of conductors, and wherein the third conductor of the first set is positioned between the first substrate and the second substrate;

a first layer of conductive material positioned on a first surface of the first substrate between the third conductor of the first set and the first substrate; and a second layer of the conductive material on a second surface of the second substrate between the third conductor of the first set and the second substrate, wherein a force applied to the first substrate decreases a size of the second space and moves the first layer of conductive material toward the second layer of conductive material.

9. The device of claim 4, wherein the first conductor of the second set comprises a layer of conductive material positioned on a surface of the first substrate, wherein the layer of conductive material is positioned between the first substrate and the second set of conductors, and wherein a force applied to the first substrate moves the layer of conductive material toward the third conductor of the first set.

10. The device of claim 4, further comprising a second substrate adjacent to the first set of conductors and a second space between the first substrate and the second substrate, wherein the first set of conductors is positioned between the second substrate and the second set of conductors, and wherein a force applied to the first substrate decreases a size of the second space and moves the first conductor of the second set toward the third conductor of the first set.

11. The device of claim 4, wherein connection of the proximal end of the first conductor of the second set and the second conductor of the second set with the circuitry enables the circuitry to determine the first capacitance associated with the first conductor of the second set and the third conductor of the first set when a first portion of the device that includes the second conductor of the second set is removed from a second portion of the device that includes the first conductor of the second set and the circuitry.

12. The device of claim 4, wherein the first capacitance associated with the first conductor of the second set and the third conductor of the first set is determined at a first time, the device further comprising circuitry to:

at a second time before the first time, determine a change in capacitance associated with a first plurality of conductors of the first set of conductors and a second plurality of conductors of the second set of conductors, wherein the first capacitance associated with the first conductor of the second set and the third conductor of the first set is determined in response to the change in capacitance;

determine a location on the device that is associated with the first conductor of the second set and the third conductor of the first set; and determine placement or removal of an item from the location based on the change in capacitance.

13. The device of claim 4, further comprising a second substrate adjacent to the first set of conductors, wherein the first set of conductors is positioned between the second substrate and the second set of conductors, and wherein:
   the first substrate and the second substrate comprise a compressible material;
   the third conductor of the first set comprises one or more of: a first conductive wire or one or more first layers of conductive material positioned on one or more of the first substrate or the second substrate; and
   the second conductor of the second set comprises one or more of: a second conductive wire or a second layer of conductive material positioned on the first substrate.

14. A device comprising:
   a first set of conductors arranged in a first direction; and
   a second set of conductors positioned adjacent to the first set and arranged in a second direction that differs from the first direction, wherein a first conductor and a second conductor of the second set each have a proximal end connected to circuitry and, and wherein the second set of conductors is electrically insulated from the first set of conductors;
   wherein the circuitry is configured to:
      determine an electrical characteristic associated with a first intersection of the first conductor of the second set and a third conductor of the first set; and
      generate an output indicative of the electrical characteristic associated with the first intersection; and
   wherein connection of the proximal end of the first conductor of the second set and the second conductor of the second set with the circuitry enables the circuitry to determine the electrical characteristic associated with the first conductor of the second set and the third conductor of the first set when a first portion of the device that includes the second conductor of the second set is removed from a second portion of the device that includes the first conductor of the second set and the circuitry.

15. The device of claim 14, wherein each conductor of the second set of conductors comprises one or more of: a conductive wire or a layer of conductive material positioned on a substrate, and wherein the each conductor of the second set of conductors is between the substrate and the first set of conductors.

16. The device of claim 14, further comprising:
   a first substrate;
   a second substrate; and
   a space between the first substrate and the second substrate, wherein the first set of conductors are positioned on a first surface of the first substrate and within the space, and the second set of conductors are positioned on a second surface of the second substrate and within the space, and wherein a force applied to the first substrate decreases a size of the space and moves the first conductor of the second set toward the third conductor of the first set.

17. The device of claim 14, further comprising:
   a first substrate, wherein the first set of conductors are positioned on the first substrate and the first set of conductors is between the first substrate and the second set of conductors;
   a second substrate, wherein the second set of conductors are positioned on the second substrate and the second set of conductors is between the second substrate and the first set of conductors;
   a space between the first substrate and the second substrate;
   a first layer of a conductive material positioned on a first surface of the first substrate between the first substrate and the first conductor; and
   a second layer of the conductive material positioned on a second surface of the second substrate between the second substrate and the first conductor; and
   wherein a force applied to the first substrate decreases a size of the space and moves the first layer of the conductive material toward the second layer of the conductive material.

18. The device of claim 14, further comprising:
   a first layer of dielectric material between the first set of conductors and the second set of conductors; and
   a second layer of dielectric material positioned over the second set of conductors, wherein a force applied to the second layer of dielectric material moves the first conductor toward the third conductor.

19. The device of claim 14, further comprising:
   a first substrate;
   a second substrate; and
   a space between the first substrate and the second substrate, wherein the first set of conductors and the second set of conductors are positioned within the space, and wherein a force applied to the first substrate decreases a size of the space, moves the first conductor of the second set toward the third conductor of the first set, and deforms the first conductor of the second set along an exterior surface of the third conductor of the first set.

20. The mat of claim 1, wherein connection of the proximal end of the first conductor of the second set and the second conductor of the second set with the circuitry enables the circuitry to determine the capacitance associated with the first conductor of the second set and the third conductor of the first set when a first portion of the mat that includes the second conductor of the second set is removed from a second portion of the mat that includes the first conductor of the second set and the circuitry.

* * * * *

UNITED STATES PATENT AND TRADEMARK OFFICE
CERTIFICATE OF CORRECTION

| | |
|---|---|
| PATENT NO. | : 12,159,756 B1 |
| APPLICATION NO. | : 17/930657 |
| DATED | : December 3, 2024 |
| INVENTOR(S) | : Andrew James Pierce et al. |

It is certified that error appears in the above-identified patent and that said Letters Patent is hereby corrected as shown below:

In the Claims

Column 17, Claim 14, Line 22:
Currently reads: "end connected to circuitry and, and wherein the"
When it should read: -- end connected to circuitry, and wherein the --

Signed and Sealed this
Seventh Day of January, 2025

Derrick Brent
*Acting Director of the United States Patent and Trademark Office*